US009248825B2

(12) United States Patent
King et al.

(10) Patent No.: US 9,248,825 B2
(45) Date of Patent: Feb. 2, 2016

(54) METHOD OF OPERATING VEHICLE AND ASSOCIATED SYSTEM (71) Applicant: General Electric Company, Schenectady, NY (US)

(72) Inventors: Robert Dean King, Schenectady, NY (US); Ajith Kuttannair Kumar, Erie, PA (US); Roland Sidney Sedziol, Niskayuna, NY (US); Lembit Salasoo, Schenectady, NY (US); Timothy Gerard Richter, Wynantskill, NY (US)

(73) Assignee: General Electric Company, Niskayuna, NY (US)

( * ) Notice: Subject to any disclaimer, the term of this patent is extended or adjusted under 35 U.S.C. 154(b) by 10 days.

(21) Appl. No.: 14/224,992

(22) Filed: Mar. 25, 2014

(65) Prior Publication Data
US 2014/0207321 A1 Jul. 24, 2014

Related U.S. Application Data (62) Division of application No. 11/749,316, filed on May 16, 2007, now abandoned.

(51) Int. Cl.
*B60W 20/00* (2006.01)
*B60L 11/12* (2006.01)
*B60L 11/18* (2006.01)

(52) U.S. Cl.
CPC ............. *B60W 20/10* (2013.01); *B60L 11/123* (2013.01); *B60L 11/1816* (2013.01); *B60L 11/1861* (2013.01); *B60L 2200/22* (2013.01); *B60L 2200/26* (2013.01); *B60L 2200/32* (2013.01); *B60L 2200/36* (2013.01); *B60L 2240/62* (2013.01); *B60L 2260/28* (2013.01); *B60W 20/00* (2013.01); *B60W 2550/402* (2013.01); *Y02T10/6217* (2013.01); *Y02T 10/7005* (2013.01); *Y02T 10/705* (2013.01); *Y02T 10/7044* (2013.01); *Y02T 10/7077* (2013.01); *Y02T 10/7291* (2013.01); *Y02T 90/14* (2013.01); *Y02T 90/16* (2013.01); *Y02T 90/162* (2013.01); *Y10S 903/903* (2013.01)

(58) Field of Classification Search
None
See application file for complete search history.

(56) References Cited

U.S. PATENT DOCUMENTS 384,580 A 6/1888 Julien
744,187 A 11/1903 Gibbs
(Continued)

FOREIGN PATENT DOCUMENTS

CA 1283472 C 4/1991
CA 2411132 A1 5/2004
(Continued)

OTHER PUBLICATIONS

Mendler, "The Technological Opportunities of Hybrid Electric Vehicles", SAE Technical Paper Series 961717, Reprinted from Technical Solutions to Alternative Transportation Problems (SP-1189), Future Transportation Technology Conference, Vancouver, Canada, pp. 1-16, Aug. 5-8, 1995.
(Continued)

*Primary Examiner* — Rami Khatib
(74) *Attorney, Agent, or Firm* — Joseph J. Christian (57) ABSTRACT

A method of operating a vehicle having an electric drive is provided. The method includes defining a first zone and a second zone. The first zone has an associated first characteristic and the second zone has an associated second characteristic that differs from the first characteristic. The method further includes switching an operating mode of a vehicle from a first operating mode in the first zone to a second operating mode in the second zone in response to the vehicle translating from the first zone to the second zone. Associated vehicles and systems are provided also.

7 Claims, 2 Drawing Sheets (56) References Cited

U.S. PATENT DOCUMENTS

| | | |
|---|---|---|
| 1,199,752 A | 10/1916 | Baker |
| 1,377,087 A | 5/1921 | Manns |
| 1,535,175 A | 4/1925 | Mancha |
| 2,403,933 A | 7/1946 | Lillqist |
| 2,472,924 A | 6/1949 | Schwendner |
| 2,510,753 A | 6/1950 | Multhaup |
| 2,704,813 A | 3/1955 | Stamm |
| 3,169,733 A | 2/1965 | Barrett, Jr. |
| 3,443,115 A | 5/1969 | Timmerman, Jr. |
| 3,569,810 A | 3/1971 | Thiele |
| 3,596,154 A | 7/1971 | Gurwicz et al. |
| 3,668,418 A | 6/1972 | Godard |
| 3,686,549 A | 8/1972 | Winebrener |
| 3,719,881 A | 3/1973 | Shibata et al. |
| 3,728,596 A | 4/1973 | Hermansson et al. |
| 3,732,751 A | 5/1973 | Berman et al. |
| 3,737,745 A | 6/1973 | Chevaugeon et al. |
| 3,792,327 A | 2/1974 | Waldorf |
| 3,832,625 A | 8/1974 | Gyugyi |
| 3,898,937 A | 8/1975 | Johnson |
| 3,919,948 A | 11/1975 | Kademann |
| 3,930,189 A | 12/1975 | Smith |
| 3,970,160 A | 7/1976 | Nowick |
| 3,982,164 A | 9/1976 | De Buhr et al. |
| 3,997,822 A | 12/1976 | Logston, Jr. et al. |
| 4,035,698 A | 7/1977 | Soderberg |
| 4,042,056 A | 8/1977 | Horwinski |
| 4,070,562 A | 1/1978 | Kuno et al. |
| 4,075,538 A | 2/1978 | Plunkett |
| 4,090,577 A | 5/1978 | Moore |
| 4,095,147 A | 6/1978 | Mountz |
| 4,096,423 A | 6/1978 | Bailey et al. |
| 4,107,402 A | 8/1978 | Dougherty et al. |
| 4,152,758 A | 5/1979 | Bailey et al. |
| 4,199,037 A | 4/1980 | White |
| 4,204,143 A | 5/1980 | Coleman |
| 4,217,527 A | 8/1980 | Bourke et al. |
| 4,284,936 A | 8/1981 | Bailey et al. |
| 4,309,645 A | 1/1982 | De Villeneuve |
| 4,313,080 A | 1/1982 | Park |
| 4,344,139 A | 8/1982 | Miller et al. |
| 4,369,397 A | 1/1983 | Read |
| 4,390,841 A | 6/1983 | Martin et al. |
| 4,417,194 A | 11/1983 | Curtiss et al. |
| 4,423,362 A | 12/1983 | Konrad et al. |
| 4,471,276 A | 9/1984 | Read |
| 4,471,421 A | 9/1984 | Brown et al. |
| 4,495,449 A | 1/1985 | Black et al. |
| 4,498,016 A | 2/1985 | Earleson et al. |
| 4,523,134 A | 6/1985 | Kinoshita et al. |
| 4,542,462 A | 9/1985 | Morishita et al. |
| 4,616,170 A | 10/1986 | Urstoger |
| 4,644,232 A | 2/1987 | Nojiri et al. |
| 4,700,283 A | 10/1987 | Tsutsui et al. |
| 4,701,682 A | 10/1987 | Hirotsu et al. |
| 4,719,861 A | 1/1988 | Savage et al. |
| 4,799,161 A | 1/1989 | Hirotsu et al. |
| 4,852,540 A | 8/1989 | Safranek |
| 4,896,090 A | 1/1990 | Balch et al. |
| 4,900,944 A | 2/1990 | Donnelly |
| 4,923,025 A | 5/1990 | Ellers |
| 4,936,610 A | 6/1990 | Kumar et al. |
| 4,941,099 A | 7/1990 | Wood et al. |
| 4,944,539 A | 7/1990 | Kumar et al. |
| 4,950,964 A | 8/1990 | Evans |
| 4,961,151 A | 10/1990 | Early et al. |
| 5,125,469 A | 6/1992 | Scott |
| 5,129,328 A | 7/1992 | Donnelly |
| 5,212,431 A | 5/1993 | Origuchi et al. |
| 5,264,764 A | 11/1993 | Kuang |
| 5,280,231 A | 1/1994 | Kato et al. |
| 5,281,900 A | 1/1994 | Park |
| 5,289,093 A | 2/1994 | Jobard |
| 5,306,972 A | 4/1994 | Hokanson et al. |
| 5,317,669 A | 5/1994 | Anderson et al. |
| 5,331,261 A | 7/1994 | Brown et al. |
| 5,332,630 A | 7/1994 | Hsu |
| 5,343,970 A | 9/1994 | Severinsky |
| 5,346,031 A | 9/1994 | Gardner |
| 5,359,228 A | 10/1994 | Yoshida |
| 5,376,868 A | 12/1994 | Toyoda et al. |
| 5,392,716 A | 2/1995 | Orschek et al. |
| 5,424,948 A | 6/1995 | Jordan, Jr. |
| 5,428,538 A | 6/1995 | Ferri |
| 5,436,538 A | 7/1995 | Garvey et al. |
| 5,436,540 A | 7/1995 | Kumar |
| 5,436,548 A | 7/1995 | Thomas |
| 5,453,672 A | 9/1995 | Avitan |
| 5,480,220 A | 1/1996 | Kumar |
| 5,508,924 A | 4/1996 | Yamashita |
| 5,510,203 A | 4/1996 | Shinji |
| 5,510,693 A | 4/1996 | Theobald |
| 5,511,749 A | 4/1996 | Horst et al. |
| 5,528,148 A | 6/1996 | Rogers |
| 5,545,928 A | 8/1996 | Kotani |
| 5,564,795 A | 10/1996 | Engle |
| 5,568,023 A | 10/1996 | Grayer et al. |
| 5,569,999 A | 10/1996 | Boll et al. |
| 5,580,677 A | 12/1996 | Nobuyasu |
| 5,580,685 A | 12/1996 | Shenk et al. |
| 5,585,706 A | 12/1996 | Avitan |
| 5,586,613 A | 12/1996 | Ehsani |
| 5,589,743 A | 12/1996 | King |
| 5,610,499 A | 3/1997 | Rogers |
| 5,610,819 A | 3/1997 | Mann et al. |
| 5,621,304 A | 4/1997 | Kiuchi et al. |
| 5,627,752 A | 5/1997 | Buck et al. |
| 5,629,567 A | 5/1997 | Kumar |
| 5,629,596 A | 5/1997 | Iijima et al. |
| 5,629,601 A | 5/1997 | Feldstein |
| 5,631,532 A | 5/1997 | Azuma et al. |
| 5,646,510 A | 7/1997 | Kumar |
| 5,659,240 A | 8/1997 | King |
| 5,661,378 A | 8/1997 | Hapeman |
| 5,677,610 A | 10/1997 | Tanamachi et al. |
| 5,685,507 A | 11/1997 | Horst et al. |
| 5,696,438 A | 12/1997 | Hamilton |
| 5,698,955 A | 12/1997 | Nii |
| 5,704,440 A | 1/1998 | Urban et al. |
| 5,710,699 A | 1/1998 | King et al. |
| 5,735,215 A | 4/1998 | Tegeler |
| 5,751,137 A | 5/1998 | Kiuchi et al. |
| 5,765,656 A | 6/1998 | Weaver |
| 5,815,824 A | 9/1998 | Saga et al. |
| 5,820,172 A | 10/1998 | Brigham et al. |
| 5,856,037 A | 1/1999 | Casale et al. |
| 5,898,281 A | 4/1999 | Bossoney et al. |
| 5,898,282 A | 4/1999 | Drozdz et al. |
| 5,939,861 A | 8/1999 | Joko et al. |
| 5,964,309 A | 10/1999 | Kimura et al. |
| 5,969,624 A | 10/1999 | Sakai et al. |
| 5,969,643 A | 10/1999 | Curtis |
| 5,986,577 A | 11/1999 | Bezos |
| 5,992,950 A | 11/1999 | Kumar |
| 5,998,880 A | 12/1999 | Kumar |
| 6,012,011 A | 1/2000 | Johnson |
| 6,021,251 A | 2/2000 | Hammer et al. |
| 6,023,137 A | 2/2000 | Kumar et al. |
| 6,025,086 A | 2/2000 | Ching |
| 6,027,181 A | 2/2000 | Lewis et al. |
| 6,037,728 A | 3/2000 | Petkovic |
| 6,044,922 A | 4/2000 | Field |
| 6,082,834 A | 7/2000 | Kolbe et al. |
| 6,104,148 A | 8/2000 | Kumar et al. |
| 6,124,690 A | 9/2000 | Yano et al. |
| 6,175,272 B1 | 1/2001 | Takita |
| 6,195,985 B1 | 3/2001 | Del Re et al. |
| 6,208,097 B1 | 3/2001 | Reddy et al. |
| 6,211,646 B1 | 4/2001 | Katsumi |
| 6,218,807 B1 | 4/2001 | Sakaue et al. |
| 6,274,998 B1 | 8/2001 | Kaneko et al. |
| 6,308,639 B1 | 10/2001 | Donnelly et al. |
| 6,314,347 B1 | 11/2001 | Kuroda et al. |
| 6,320,274 B1 | 11/2001 | Goetze et al. |

(56) References Cited

U.S. PATENT DOCUMENTS

| | | | |
|---|---|---|---|
| 6,327,852 B1 | 12/2001 | Hirose | |
| 6,331,365 B1 | 12/2001 | King | |
| 6,359,346 B1 | 3/2002 | Kumar | |
| 6,362,602 B1 | 3/2002 | Kozarekar | |
| 6,367,570 B1 | 4/2002 | Long, III et al. | |
| 6,367,891 B1 | 4/2002 | Smith et al. | |
| 6,371,573 B1 | 4/2002 | Goebels et al. | |
| 6,384,489 B1 | 5/2002 | Bluemel et al. | |
| 6,405,705 B1 | 6/2002 | Dunsworth et al. | |
| 6,408,766 B1 | 6/2002 | McLaughlin et al. | |
| 6,417,646 B1 | 7/2002 | Huykman et al. | |
| 6,421,618 B1 | 7/2002 | Kliman et al. | |
| 6,441,581 B1 | 8/2002 | King et al. | |
| 6,449,536 B1 | 9/2002 | Brousseau et al. | |
| 6,456,674 B1 | 9/2002 | Horst et al. | |
| 6,456,908 B1 | 9/2002 | Kumar | |
| D464,622 S | 10/2002 | Donnelly | |
| 6,470,245 B1 | 10/2002 | Proulx | |
| 6,486,568 B1 | 11/2002 | King et al. | |
| 6,497,182 B2 | 12/2002 | Melpolder et al. | |
| 6,507,506 B1 | 1/2003 | Pinas et al. | |
| 6,509,720 B2 | 1/2003 | Ikeda | |
| 6,518,732 B2 | 2/2003 | Palanisamy | |
| 6,532,405 B1 | 3/2003 | Kumar et al. | |
| 6,537,694 B1 | 3/2003 | Sagiura et al. | |
| 6,541,938 B2 | 4/2003 | Okamura et al. | |
| 6,561,295 B1 | 5/2003 | Kuroda et al. | |
| 6,564,172 B1 | 5/2003 | Till | |
| 6,581,464 B1 | 6/2003 | Anderson et al. | |
| 6,591,758 B2 | 7/2003 | Kumar | |
| 6,608,396 B2 | 8/2003 | Downer et al. | |
| 6,611,116 B2 | 8/2003 | Bachman et al. | |
| 6,612,245 B2 | 9/2003 | Kumar et al. | |
| 6,612,246 B2 | 9/2003 | Kumar | |
| 6,615,118 B2 | 9/2003 | Kumar | |
| 6,618,662 B2 | 9/2003 | Schmitt et al. | |
| 6,627,345 B1 | 9/2003 | Zemlok et al. | |
| 6,634,303 B1 | 10/2003 | Madsen et al. | |
| 6,653,002 B1 | 11/2003 | Ronald | |
| 6,657,315 B1 | 12/2003 | Peters et al. | |
| 6,658,331 B2 | 12/2003 | Horst et al. | |
| 6,678,972 B2 | 1/2004 | Naruse et al. | |
| 6,682,458 B2 | 1/2004 | Gabriel et al. | |
| 6,686,724 B2 | 2/2004 | Coates et al. | |
| 6,688,481 B1 | 2/2004 | Adner et al. | |
| 6,691,005 B2 | 2/2004 | Proulx | |
| 6,697,716 B2 | 2/2004 | Horst | |
| 6,725,134 B2 | 4/2004 | Dillen et al. | |
| 6,728,606 B2 | 4/2004 | Kumar | |
| 6,737,822 B2 | 5/2004 | King | |
| 6,765,315 B2 | 7/2004 | Hammerstrom et al. | |
| 6,768,447 B2 | 7/2004 | Frackart | |
| 6,769,400 B1 | 8/2004 | Ament | |
| 6,787,933 B2 | 9/2004 | Claude et al. | |
| 6,812,656 B2 | 11/2004 | Donnelly et al. | |
| 6,823,835 B2 | 11/2004 | Dunsworth et al. | |
| 6,829,529 B2 | 12/2004 | Trefzer et al. | |
| 6,829,556 B2 | 12/2004 | Kumar | |
| 6,837,320 B2 | 1/2005 | Wakashiro et al. | |
| 6,879,054 B2 | 4/2005 | Gosselin | |
| 6,885,920 B2 | 4/2005 | Yakes et al. | |
| 6,909,200 B2 | 6/2005 | Bouchon | |
| 6,909,201 B2 | 6/2005 | Murty et al. | |
| 6,909,959 B2 | 6/2005 | Hallowell | |
| 6,941,218 B2 | 9/2005 | Wolf et al. | |
| 6,949,911 B2 | 9/2005 | Laig-Hoerstebrock et al. | |
| 6,973,880 B2 | 12/2005 | Kumar | |
| 6,982,540 B2 | 1/2006 | Richter et al. | |
| 6,984,946 B2 | 1/2006 | Donnelly et al. | |
| 6,998,727 B2 | 2/2006 | Gray, Jr. | |
| 7,005,830 B2 | 2/2006 | Moore et al. | |
| 7,038,619 B2* | 5/2006 | Percy et al. | 342/357.52 |
| 7,040,269 B2 | 5/2006 | Dehrmann et al. | |
| 7,049,792 B2 | 5/2006 | King | |
| 7,061,246 B2 | 6/2006 | Dougherty et al. | |
| 7,102,313 B2 | 9/2006 | Kadota et al. | |
| 2001/0029425 A1 | 10/2001 | Myr | |
| 2002/0139593 A1 | 10/2002 | Charaudeau et al. | |
| 2002/0190525 A1 | 12/2002 | Worden et al. | |
| 2003/0150352 A1 | 8/2003 | Kumar | |
| 2003/0151387 A1 | 8/2003 | Kumar | |
| 2003/0233959 A1 | 12/2003 | Kumar | |
| 2004/0133315 A1 | 7/2004 | Kumar et al. | |
| 2004/0135547 A1* | 7/2004 | Eifert et al. | 320/132 |
| 2005/0024001 A1 | 2/2005 | Donnelly et al. | |
| 2005/0045058 A1 | 3/2005 | Donnelly et al. | |
| 2005/0120904 A1* | 6/2005 | Kumar et al. | 105/35 |
| 2005/0173523 A1* | 8/2005 | Yushio et al. | 235/384 |
| 2005/0251299 A1 | 11/2005 | Donnelly et al. | |
| 2005/0278079 A1 | 12/2005 | Maguire | |
| 2005/0279243 A1 | 12/2005 | Bendig et al. | |
| 2006/0001399 A1 | 1/2006 | Salasoo et al. | |
| 2006/0173593 A1* | 8/2006 | Anderson | 701/36 |
| 2008/0288132 A1 | 11/2008 | King et al. | |
| 2010/0102776 A1* | 4/2010 | Uchida | 320/109 |

FOREIGN PATENT DOCUMENTS

| | | |
|---|---|---|
| CN | 2657974 Y | 11/2004 |
| DE | 19807291 A1 | 8/1999 |
| DE | 19937381 A1 | 3/2001 |
| DE | 10128758 A1 | 12/2002 |
| EP | 0348938 B1 | 6/1993 |
| EP | 0800947 A2 | 10/1997 |
| EP | 1688707 A1 | 8/2006 |
| EP | 1769997 A2 | 4/2007 |
| EP | 1810861 A1 | 7/2007 |
| EP | 1842757 A1 | 10/2007 |
| EP | 1842758 A1 | 10/2007 |
| GB | 873167 A | 7/1961 |
| GB | 1129709 A | 10/1968 |
| GB | 1312699 A | 4/1973 |
| GB | 2005205 A | 4/1979 |
| GB | 2358006 A | 7/2001 |
| JP | 07075210 A | 3/1995 |
| JP | 08154309 A | 6/1996 |
| JP | 08240435 A | 9/1996 |
| JP | 2000038940 A | 2/2000 |
| JP | 2000134719 A | 5/2000 |
| JP | 2003032804 A | 1/2003 |
| JP | 2003111208 A | 4/2003 |
| WO | 03072388 A1 | 9/2003 |
| WO | 2004042890 A1 | 5/2004 |
| WO | 2005030550 A1 | 4/2005 |
| WO | 2005079504 A2 | 9/2005 |
| WO | 2005084335 A2 | 9/2005 |
| WO | 2005086910 A2 | 9/2005 |

OTHER PUBLICATIONS

Thompson, "Electric Transportation", International Textbook Co., Scranton, PA, (1st Edition), pp. 254-262, 1940.

Simmons Boardman Publishing Corp., "Switchers, the Gen-Set Generation", Railway Age, p. 12, Mar. 2006.

Weighall, "Keeping Up the Pressure—Strategies to Maintain Plate-Group Pressure and Extend the Cycle Life of VRLA Batteries", Journal of Power Sources, vol. 95, pp. 209-217, 2001.

Cooper et al., "Progress in Overcoming the Failure Modes Peculiar to VRLA Batteries", Journal of Power Sources, vol. 113, pp. 200-208, 2003.

Moseley, "Research Results From the Advanced Lead-Acid Battery Consortium Point the Way to Longer Life and Higher Specific Energy for Lead/Acid Electric-Vehicle Batteries", Journal of Power Sources, vol. 73, pp. 122-126, 1998.

Moseley, "Improving the Valve-Regulated Lead—Acid Battery", Journal of Power Sources, vol. 88, pp. 71-77, 2000.

Perreault et al., "A New Design for Automotive Alternators", Massachusetts Institute of Technology, 12 pages.

Ito et al., "Development of a New Battery System for Hybrid Vehicles", Toyota Technical Review, vol. 54, No. 1, pp. 61-66, Nov. 2005.

(56) References Cited

OTHER PUBLICATIONS

Alberkrack et al., "The Future for Switching Regulators", Linear/Switchmode Voltage Regulator Handbook, Motorola, Inc., Section 12, pp. 103-104, 1982.

Mercer, "Innovative Uses of Horsepower—Hybrid Bus Powered by Gas Turbine", Diesl Progress, North American Edition, pp. 56-57, Dec. 1997.

Vijayraghavan, "Design of Switched Reluctance Motors and Development of a Universal Controller for Switched Reluctance and Permanent Magnet Brushless DC Motor Drives", Virginia Polytechnic Institute and State University, 215 pages, Nov. 15, 2001.

Band et al., "Development of and Operational Experience With a High Powered D.C. Chopper for 1500 Volt D.C. Railway Equipment", Conference on Power Thyristors and their Applications, pp. 277-288, May 6-8, 1969.

Nene, "DC Drives With a Chopper Controller", Advanced Propulsion Systems for Urban Rail Vehicles, Chapter 2, pp. 18-49, 1985.

Kostic et al., "An Analytic Solution of the Choppers Ripple Currents", Proceedings of the 1993 IEEE/ASME Joint Railroad Conference, Faculty of Transport and Traffic Engineering, University of Belgrade, Yugoslavia, pp. 103-107, Apr. 1993.

Moghbelli et al., "Chopper Design for NICTD Locomtives", Proceedings of the 1993 IEEE/ASME Joint Railroad Conference, pp. 67-75, Apr. 1993.

Szymborski et al., "Examination of VRLA Cells Sampled From a Battery Energy Storage System (BESS) After 30—Months of Operation", 11 pages.

Dahdah et al., "Performance and Control of the Switched Reluctance Motor", University of Western Sydney, Nepean, 4 pages.

De Brabandere et al., "The Control of Switched Reluctance Drives and Their Use for Flywheel Energy Storage", Heverlee, Belgium, 5 pages.

Chen, "Li-Ion Battery-Powered Buck-Boost Regulator Minimizes Portable Product Size", IIC-China/ESC-China Conference Proceedings, pp. 359-363, 2002.

Perez, "Lead-Acid Battery State of Charge vs. Voltage", Home Power 36, 5 pages, Aug./Sep. 1993.

Zolot et al., "Thermal Evaluation of the Honda Insight Battery Pack", National Renewable Energy Laboratory (NREL), Proceedings of IECEC101: 36th Intersociety Energy Conversion Engineering Conference, Savannah, Georgia, pp. 923-928, Jul. 29-Aug. 2, 2001.

Press Release, "French Railway Company Voies Ferrees Legeres et Industrielles (VFLI) Puts Its Trust in DEUTZ Engines", 2 pages, Jun. 2003.

Hapeman et al., "Diesel Electric Locomotive Propulsion Systems—A Look Into the Future", IEEE Technical Papers Presented at the 1985 Joint ASME/IEEE Railroad Conference, New York City, New York, pp. 108-115, Apr. 16-18, 1985.

European Search Report and Written Opinion issued in connection with corresponding EP Application No. 12174839.6 dated Jun. 3, 2013.

European Search Report issued in connection with corresponding EP Application No. 12174839.6 dated Feb. 27, 2013.

European Search Report and Written Opinion issued in connection with corresponding EP Application No. 08161865.4 dated Feb. 4, 2009.

European Search Report issued in connection with corresponding EP Application No. 08161865.4 dated Nov. 12, 2008.

\* cited by examiner

METHOD OF OPERATING VEHICLE AND ASSOCIATED SYSTEM

CROSS-REFERENCE TO RELATED APPLICATION

This application is a divisional of application Ser. No. 11/749,316, filed 16 May 2007, which is hereby incorporated by reference herein in its entirety.

BACKGROUND

1. Technical Field

The invention includes embodiments that relate to method of using the propulsion system. The invention includes embodiments that relate to a vehicle and system.

2. Discussion of Art

Hybrid propulsion systems have been developed to recover some of the energy that would otherwise be wasted as heat during dynamic braking. The recovery of this otherwise-wasted energy is regenerative braking. Hybrid propulsion systems can use two different energy sources: a heat engine and an energy storage unit. The engine may burn fuel to produce mechanical work—an internal combustion engine, a turbine engine, and a diesel engine are examples. The energy storage unit may include an electrically re-chargeable battery, an ultracapacitor, or a flywheel having a high power density.

The hybrid propulsion systems can act with regard to specific local events, such as a braking request or an acceleration request. The hybrid propulsion systems do not have a general awareness of the surrounding environment, and do not change functionality based on that awareness. To the extent that any vehicle can sense the environment, one hybrid vehicle monitors ambient temperature and shuts down battery use at ambient temperatures that would damage the batteries.

It may be desirable to have a propulsion system that implements a method of operation that differs from those methods currently available. It may be desirable to have a propulsion system with properties and characteristics that differ from those properties and characteristics of currently available propulsion systems.

BRIEF DESCRIPTION

The invention includes embodiments that relate to method of operating a vehicle having an electric drive. The method includes defining a first zone and a second zone. The first zone has an associated first characteristic, and the second zone has an associated second characteristic that differs from the first characteristic. The method further includes switching an operating mode of a vehicle from a first operating mode in the first zone to a second operating mode in the second zone in response to the vehicle translating from the first zone to the second zone.

The invention includes embodiments that relate to an electrically drivable vehicle. The vehicle can include a controller capable of switching the operating mode of the vehicle from the first operating mode in the first zone to the second operating mode in the second zone in response to the vehicle translating from the first zone to the second zone. The first zone has the associated first characteristic and the second zone has the associated second characteristic that allows the zones to differs from each other. The vehicle further can include a sensor communicating with the controller that can determine if the vehicle translates to and from the second zone.

The invention includes embodiments that relate to a system having information correlating an amount of electrical energy used by a vehicle to an amount of fuel consumed by the vehicle or an amount of emissions emitted by the vehicle. The system includes a sensor and a controller. The sensor can measure the amount of energy supplied by the energy storage device and can communicate information about that energy amount to the controller. And, the controller can use the correlation data and the measured amount of the energy supplied by the energy storage device to determine a saved amount of fuel or a reduced amount of emissions that would have otherwise occurred had the energy come from an engine rather than the energy storage device.

DETAILED DESCRIPTION

The invention includes embodiments that relate to method of operating a propulsion system. The invention includes embodiments that relate to a vehicle having the propulsion system. The invention includes embodiments that relate to the vehicle propulsion system. The ability to change operating modes depending on geographic locations may allow control of vehicle characteristics, such as emissions, and may allow vehicle operations having a reduced environmental impact in environmentally sensitive regions.

As used herein, voltage refers to direct current (DC) voltage unless context or language indicates otherwise. A prime mover includes an engine and an electrical generator, e.g. a diesel engine/alternator combination. Generally, an energy battery has a ratio that presents more energy than power, whereas a power battery has a greater power rating than energy rating.

Figure 1:
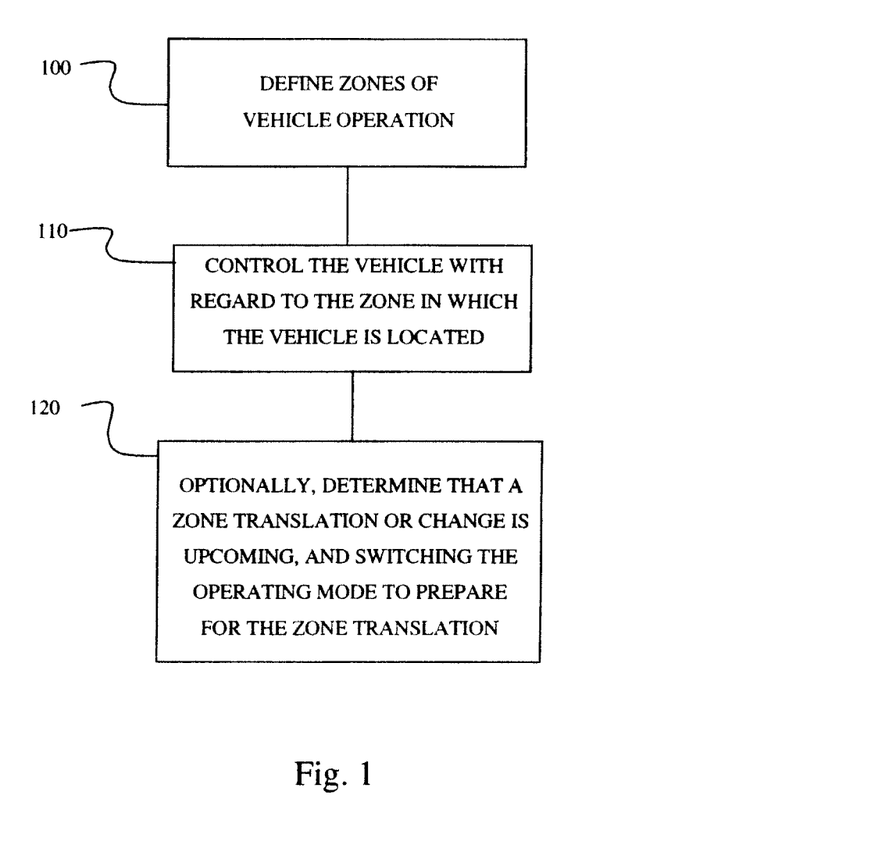
FIG. 1 is a schematic block diagram of a method comprising an embodiment according to the invention.

With reference to FIG. 1, a method according to an embodiment of the invention is shown. The method includes defining zones of vehicle operation (block 100), and controlling the vehicle operating mode with regard to the zone in which the vehicle is located (block 110). Optionally, the method can include determining that a zone translation or change is upcoming, and switching the operating mode to prepare for the zone translation (block 120).

With regard to the zones, they include at least a first zone and a second zone. The first zone has an associated first characteristic and the second zone has an associated second characteristic that differs from the first characteristic. As used herein, the first zone is an area with relatively fewer restrictions on operating parameters, and the second zone is an area that has relative more concerns on operating parameters than the first zone. While the zone differences are discussed further hereinbelow, a mention here of one embodiment in which the first zone is relatively not sensitive to emissions, and in which the second zone is an environmentally sensitive region, may help characterize the disclosure that follows.

The zones may have an interface or line separating them from each other, or from an inter-disposed zone (discussed later as a third zone). The first zone may be distinguished from the second zone by a geo-fence. Other methods of defining or bounding the first zone include identifying a geographical area. The geographical limits may correspond to territorial rights, such as state lines, county lines, country borders, and the like. Also, the geographical limits may correspond to natural terrain features, such as rivers, hills, and the like. Yet other methods of bounding the zones include identification of certain features or characteristics that can be associated with a location. For example, the Los Angeles basin can be characterized as an environmentally sensitive zone (first characteristic) that needs less pollution and fewer vehicle emissions. Another example is an area in which a tax scheme is in force (e.g., London, England) so that emissions are tracked and taxed within a defined municipality. The tax scheme, conversely, may supply a credit or benefit for emissions reduction within a defined area (i.e., second zone).

The zones need not be static in some embodiments. If emissions are more damaging during a particular time of day, one may define a boundary of the first zone dynamically with reference to a time of day. If noise is a concern in a noise-sensitive area, the zones may be differentiated by those areas where the noise is a concern and during those hours of the day in which the noise is concern.

The same may be done dynamically with reference to a day of a week. For example, if vehicle operations are to be near an area where particulate is a concern while the local population is exposed, then the zone may be defined to that area and during those days of concern. If, for example, a beach is fully occupied on a weekend, but not on a weekday, and particles are a concern when the beach is fully occupied, then the zone can be near the beach during the weekend.

With some planning, it is possible to identify yearly patterns, such as national holidays during which behavior is predictable. If so, then defining a boundary of the first zone dynamically with reference to a day of a year is possible.

Because weather is closely monitored in most of the world, the weather, climate or environment may be an environmental indicator to define a zone. A method may then limit the first zone dynamically by reference to the environmental indicator corresponding to the zone. For example, if an ozone alert is called for in an area and that alert is based on weather and climate conditions, that alert may serve as an environmental indicator—where, in one embodiment, an ozone-reduced operating mode may be used as the second operating mode in the second zone. Other suitable environmental indicator may include an ultraviolet (UV) index, pollution index, ground level ozone content, ground level NOx content, ground level SOx content, carbon dioxide content, carbon monoxide content, wind speed, wind direction, particulate matter content, or pollen count.

The first zone can be defined in absolute terms (e.g., a state line), or in relative terms compared to the second zone (e.g., a more restrictive tax scheme). For example, the first characteristic can be, relative to the second characteristic, a tax benefit or a reduction in one or more of tax liability based on one or more of emissions, fuel consumption, or noise; emissions; fuel consumption; or, noise. In an alternative embodiment, the first characteristic is a topologically-based ability to regenerate an energy storage device of the vehicle.

According to an embodiment of the invention, as the vehicle passes or translates from one zone to another zone, a controller on the vehicle recognizes that the translation is occurring (or about to occur) and controls the vehicle to switch an operating mode of a vehicle from a first operating mode in the first zone to a second operating mode in the second zone. In one aspect, the geo-fence or zone boundary is marked, and the operating mode switch is in response to the vehicle translating from the first zone to the second zone, or vice versa. Alternatively, a vehicle operator may engage a manual toggle to initiate the switch in one embodiment.

While operating in the first operating mode, the vehicle may be used in a manner to accomplish at least one of: an increase in battery life, an increase in battery charge, an increase in vehicle speed, or an increase in fuel economy according to one embodiment. In another embodiment, the first operating mode may include optimizing vehicle performance outside of the second zone so that upon entering the second zone at least one battery characteristic is in a determined state for use in the second zone. Such battery characteristics may include battery temperature or the battery state of charge. Particularly, the battery state of charge refers to the useable charge energy of the battery or bank of batteries. In another embodiment, the vehicle may operating in the first zone so that there is a reduction or elimination of discharge of an energy storage device coupled to electrical drive motors of the vehicle. Thus, the energy storage device devices (or batteries that are included therein) are ready for use upon translation into the second zone.

With reference to the second operating mode, the vehicle operates in a manner to accomplish at least one of: an increased tax benefit based on one or more of reduced emissions, reduced fuel consumption, or reduced noise; decreased emissions; decreased fuel consumption; or, a decreased tax liability based on one or more of emissions, fuel consumption, or noise. Alternatively or additionally, the vehicle in the second mode of operation may operate so that the vehicle has decreased noise from an on-board engine. In one illustrative embodiment, the vehicle can top off the charge on an energy storage device having a bank of batteries in the first zone on approach to the second zone and use a diesel engine without regard to fuel efficiency, and after translating into the second zone the diesel engine is shut down or idled and the vehicle can be propelled by the energy storage device supplying electricity to traction motors.

And, in one embodiment, the second zone may include a topologically-based need for a regenerated energy storage device of the vehicle. For example, the energy stored in the energy storage device may be drawn out and used to supply an energy boost to climb a hill.

The method may provide for the second operating mode to include operating the vehicle by drawing stored energy from an energy storage device of the vehicle. Alternatively, the second operating mode comprises operating the vehicle by drawing energy only from an energy storage device of the vehicle and not from an engine of the vehicle. Suitable energy storage devices may include batteries, fuel cells, fly wheels, ultracapacitors, combinations of the foregoing, and the like. Suitable batteries may include energy batteries, power batteries, or both energy and power batteries where the energy to power ratio determines whether the battery is one or the other. Suitable energy batteries may include high temperature batteries, such as metal halide batteries, aluminum-based batteries, and sodium sulfur batteries. Suitable power batteries may include lithium bases, nickel metal hydride, zinc matrix, lead acid, and the like.

In one embodiment, the second operating mode may include a process of determining a compliant operating mode that is a mixture of energy from an energy storage device of the vehicle and from an engine of the vehicle. Once the proportion is determined, the controller controls the engine to run in a manner that has at least one of less noise, less emissions, or less of a taxable event relative to only the first mode of operation.

The translation point, static or dynamically defined, may be determined using a signal/sensor pair, a global positioning system, or a calculation based on a known route and a distance or time/speed measurements along the route. For the later, locomotives having well-defined routes may be particularly amenable. A suitable signal/sensor pair may include a radio frequency identification (RFID) sensor and/or an RFID signal generator. The RFID may be used, for example, so that a zone boundary (particularly when static) has an RFID component located thereon. The corresponding RFID part can be located on the vehicle. Depending on the situation, it may be more economical to have the sensor or the emitter on the vehicle, and the RFID tag can be either active or passive as the application may warrant.

Figure 2:
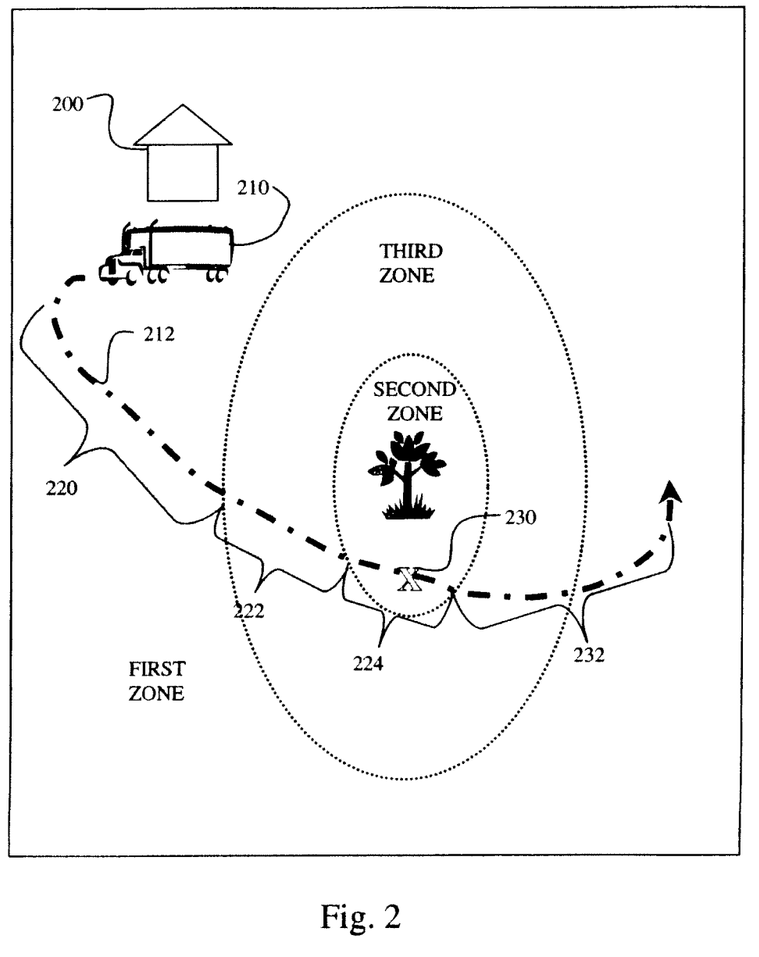
FIG. 2 is a schematic diagram illustrating a method comprising an embodiment according to the invention.

With reference to FIG. 2, another embodiment of the invention includes defining a third zone having an associated third characteristic. The method further includes switching the vehicle to a third operating mode in the third zone in response to the vehicle translating to the third zone from the first zone. The schematic representation in FIG. 2 illustrates the zones in an exemplary, but non-limiting, concentric arrangement— where the first zone is outside of the second zone, and the third zone (or charging zone) is shown therebetween. A depot 200 is a starting point for a delivery truck 210 that winds on a route 212 through each of the three zones. The first travel segment 220 shows an operating mode in which speed and fuel consumption are balanced and maximized. The second travel segment 222 shows an operating mode in which the on-board energy batteries are charged up to a maximum useable charge and the battery temperature is adjusted. The third travel segment 224 shows an operating mode in which the engine is shut down and the energy storage device supplies electricity to traction motors to drive the vehicle to the destination 230, and then after a stop to beyond the destination. The fourth travel segment 232 shows an operating mode in which the engine is restarted and the energy storage device is recharged.

The third zone is disposed adjacent to the second zone. The third characteristic, used to define the metes and bounds of the third zone, may include a calculated minimum travel length to take an energy storage device on the vehicle from a current state of charge to a full state of charge. The third zone can extend directly outward from the boundary of the second zone; but, as the travel path through the third zone can be skew, tortuous or circuitous rather than linear and perpendicular the third zone need not be as wide as the minimum length needed for the vehicle to charge up the on-board batteries.

Another suitable third characteristic may include a topographical feature biased for regenerative braking, such as a downgrade. For the calculation of the minimum travel path, several factors may be taken into account. These factors may include: the amount of energy needed to traverse the second zone, the amount of additional energy that may be taken up by the energy storage device while in the second zone (by regenerative braking or by a plug-in stop, for example), the time and/or distance to the outer boundary of the second zone, the terrain or route conditions leading up to and adjacent the second zone, the uptake rate of the energy storage device, the energy output of the regenerative braking system, and the like.

The method may include determining a current state of charge of an energy storage device of the vehicle and determining a minimum distance for regenerative braking to bring the energy storage device from the current state of charge to a full useable state of charge. Alternatively or additionally, the method may include adjusting a route of the vehicle so that a travel path of the vehicle in the third zone is of sufficient length to charge an energy storage device of the vehicle to a full useable charge state. In one embodiment, the travel path through the third zone is adjusted to take advantage of a down grade, during which regenerative braking is used to charge the energy storage device. The method can further include determining the projected travel path length in the second zone, determining a state of charge of an energy storage device of the vehicle, determining an expected hybrid propulsion distance based on the useable state of charge, and comparing the expected hybrid propulsion distance to the travel path length. If the distance that the battery charge can carry the vehicle is further than the expected distance in the second zone, then the control system can just monitor the battery state and there is no need to top off the energy stored in the energy storage device. But, if the energy in the energy storage device appears insufficient, the controller can begin a process of charging up the energy storage device. Suitable charging regimes can include re-routing to a down grade to use regenerative braking, applying an opposing torque on the hybrid axels so that the engine indirectly charges the energy storage device "through the road" where the engine supplies more propulsive power than is needed for propulsion and the hybrid axels simultaneously brake to re-charge, or the energy storage device communicates with the alternator to charge directly therefrom. Using one of the foregoing methods, it is possible to charge the energy storage device to a full useable state of charge in the third zone prior to translating to the second zone.

To optimize the recharging process, the regenerative braking may take into account a component limiting factor. For example, the energy storage device may have an energy uptake of a particular rate. The method, then, may slow the vehicle using regenerative braking at a rate that is determined by the energy uptake rate of the energy storage device or, as another example, the energy generating capacity of a regenerative braking system coupled thereto.

In one embodiment, the first operating mode includes operating an auxiliary electrical system in a first, higher-energy consuming operating mode. The second operating mode can include operating the auxiliary electrical system a second, lower-energy consuming operating mode. In this manner, it may be possible to use larger amounts of electrical energy where there is an abundance, and when there is a finite supply (for example, a finite battery capacity) change to a reduced electrical consumption operating mode. This may allow more electrical energy to be directed to propulsive effort in the second zone.

Methods according to the present invention may be implemented by an electrically drivable vehicle. The vehicle may include at least a controller and a sensor. The controller can switch an operating mode of the vehicle from a first operating mode in a first zone to a second operating mode in a second zone. The mode switch may be in response to the vehicle translating from the first zone to the second zone. The sensor communicates with the controller, and informs the controller if the vehicle translates to and from the second zone. The vehicle may include an energy storage device that can propel, or assist in propelling, the vehicle in at least one mode of operation. In one embodiment, the energy storage device is not electrically coupled to an engine-driven alternator. An example may include a hybrid locomotive where two of the six traction motors are decoupled from the DC link and re-routed to the energy storage device. Alternatively, the vehicle may be a plug-in hybrid and not have an engine. In an illustrative embodiment, the vehicle is a diesel electric hybrid locomotive. Other suitable vehicles may include off-highway vehicles, marine vehicles, busses, vans, tractor-trailer rigs, and passenger vehicles. Each vehicle type, naturally, has differing needs and requirements associated therewith—such as voltage requirements, emissions regulations, maintenance needs, and travel patterns.

In one embodiment, the vehicle may further include a fuel cell that is operable to supply energy to an auxiliary electrical system or an electrical vehicle accessory system. The fuel cell may be electrically coupled directly to the energy storage device, or may be routed through a boost converter. Alternatively, the fuel cell may be coupled to a traction drive motor so that the fuel cell energy may supplement the propulsive effort of the vehicle, as needed or desired.

In another embodiment, a system is provided that has information correlating an amount of energy used by a vehicle to an amount of fuel consumed by the vehicle or an amount of emissions emitted by the vehicle. That is, based on an amount of electrical energy used to drive propulsive motors, the information correlates that energy amount to an amount of fuel needed to generate that amount of energy either by an on-board engine or by an engine in another vehicle. The system includes a controller and a sensor. The sensor can measure either an amount of energy supplied by an energy storage device, or an amount of energy consumed by a propulsive traction motor. The sensor can communicate information about that supplied or consumed energy amount to the controller. The controller can determine, based on the correlation data, a saved amount of fuel or a reduced amount of emissions based on the amount of the energy supplied by the energy storage device or consumed by the traction motor.

Optionally, in the system, at least a portion of the energy supplied by the energy storage device was provided to the energy storage device by regenerative braking of the vehicle. The correlating information can refer to an engine only propelled vehicle that consumes fuel and emits emissions, so that the amount of fuel saved or emissions reduced is an amount referring to the instant vehicle relative to the engine only propelled vehicle. A display screen can be secured to the vehicle that displays the amount of fuel not consumed by the vehicle or an amount of emissions not emitted by the vehicle, relative to operation of that vehicle, or another like vehicle, not operating in a particular fuel or emissions saving mode.

A vehicle having a control system that can implement a method according to an embodiment of the invention may have a distributed energy storage system. A prime mover supplies electrical power to first or conventional traction drives, while the remaining second or hybrid traction drives are electrically powered via one or more energy storage devices. During periods of extended high motive power operation when the energy stored in the energy storage unit is sufficiently depleted, the controller may allow power from the prime mover to be used in the propulsion drives that were initially powered from the energy storage units.

During braking events, where a traction drive torque command is in the opposite polarity as required for traction drive operation in a motoring mode, a portion of the regenerative braking energy may be captured in the energy storage units, this is "through the road" charging of the energy storage device. High power regenerative braking energy can be captured in the energy storage system until a determined charge or voltage limit is attained. Then, the energy can be dissipated in a conventional dynamic brake grid as waste heat. Likewise, during extended periods of operation at high motive power when the energy storage unit depletes, the power control apparatus directs the prime mover to supply power using energy from the on-board engine. Selection of the electrical configuration provides that the system can propel the vehicle at relatively lower speeds and potentially high torques by using the second traction drive system, and the system can propel the vehicle at relatively higher speeds and moderate torques by using at least the first traction drive system. Particularly, at higher speeds or under heavy load conditions (heavy haul, high speed, or steep grade) energy can be pulled out of the energy storage device to power the second traction drive system in conjunction with the motive power supplied by the first traction drive system.

The auxiliary electrical system may be electrically connected to the energy storage device. The auxiliary electrical system can supplement a prime auxiliary electrical system by supplying electrical energy to the prime auxiliary electrical system, especially during periods when regenerative energy is extracted from the traction drive systems. The auxiliary electrical system can supplement the prime auxiliary electrical system by supplying electrical energy to some subcomponents while the prime auxiliary electrical system supplies electrical energy to other subcomponents. One example is that the auxiliary electrical system can operate critical auxiliary components while the prime auxiliary electrical system is disabled or shutdown to eliminate noise or emissions, or to reduce fuel consumption by the engine.

Output voltage from the engine driven alternator may be controlled based on vehicle speed, traction torque, and load. Depending on energy storage device and load, propelling an electrically driven vehicle at a first, slower speed and potentially high torque, can be performed using the second electric motor alone, i.e. Electric Vehicle mode (EV), or in combination with the engine-driven alternator to a first electric motor, i.e. Hybrid Electric Vehicle Mode (HEV). Of note is that differing voltages may be implicated by different end uses. Passenger cars and light duty trucks may utilize a voltage of about 200 volts to about 400 volts; medium duty trucks, vans, and busses may utilize a voltage of about 500 to about 650 volts; and locomotives may use voltages of up to about 1400 volts.

In one embodiment, the control system can initiate a braking event calling for an amount of a required braking power. The first available braking power can be based on a component limiting factor determined by at least one of: power capacity of the first traction motor, electrical uptake capacity of the energy storage device, electrical rating capacity of an electronic inverter, or electrical rating capacity of a power switch. The first available braking power is compared to the required braking power. The required braking power can be first met with the first available braking power. The first available braking power can be supplemented with a second available braking power if the first available braking power is insufficient to meet the required braking power. The second available braking power can be based on at least a capacity of a dynamic braking grid resistor array coupled the second traction motor.

In one embodiment, the method may further include charging the energy storage device by converting mechanical energy during a braking mode of operation of the second electric motor to electrical energy. An operating mode may be selected for use in which a greater than full motive power propels the vehicle relative to another operating mode in which power from a prime mover combines with energy supplied from one or more energy storage devices. Alternatively, an operating mode may be selected in which all of the propulsive power supplied to one or more traction motors is energy supplied from one or more energy storage devices. Another operating mode is provided in which all propulsive power supplied to one traction motor is energy supplied from one or more energy storage devices, and in which all propulsive power supplied to another traction motor is energy supplied from an alternator.

Another method according to embodiments of the invention may include initiating a braking event calling for an amount of a required braking power. A first available braking power may be determined based on a component limiting factor determined by at least one of: power capacity of an electric motor, electrical uptake capacity of an energy storage device, electrical rating capacity of an electronic inverter, or electrical rating capacity of a power switch; and comparing the first available braking power to the required braking power. The required braking power may be supplied first with the first available braking power. As needed, the first available braking power can be supplemented with a second available braking power. The second available braking power is based on at least a capacity of a dynamic braking grid resistor array coupled thereto. Optionally, the energy storage device can include an energy battery, and a power battery that has a relatively faster uptake of energy than the energy storage battery. The regeneratively captured energy can be routed to the power device with or without routing to the energy battery. From there, the energy can be fed from the power battery to the energy battery at a rate of uptake that the energy battery can handle.

While examples were given with some reference to locomotives, the propulsion system may be useful in other vehicle types. Other suitable vehicles may include passenger vehicles; medium or light duty vans and trucks; busses and heavy duty trucks and construction equipment; off-highway vehicles (OHV); and boats, ships and submarines.

The embodiments described herein are examples of structures, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A system for determining information associated with a vehicle, the system comprising:
    a controller operable to determine a saved amount of fuel and a reduced amount of emissions; and
    a sensor operable to measure an amount of energy supplied by an energy storage device and to communicate information about the amount of energy to the controller,
    wherein the controller is operable to determined the saved amount of fuel and the reduced amount of emissions based on the amount of the energy supplied by the energy storage device and information correlating an amount of energy used by the vehicle to an amount of fuel consumed by the vehicle and an amount of emissions emitted by the vehicle, for reducing tax liability of the vehicle.

2. The system as defined in claim 1, wherein at least a portion of the energy supplied by the energy storage device was provided to the energy storage device by regenerative braking of the vehicle.

3. The system as defined in claim 1, wherein the correlating information refers to an engine only propelled vehicle that consumes fuel and emits emissions, so that the amount of fuel saved or emissions reduced is an amount referring to an instant vehicle relative to the engine only propelled vehicle.

4. The system as defined in claim 1, further comprising a display screen secured to the vehicle, that displays the amount of fuel consumed by the vehicle and the amount of emissions emitted by the vehicle.

5. The system as defined in claim 1, wherein the vehicle comprises a locomotive, a passenger vehicle, a medium or light duty van, a truck, a bus, a heavy duty truck, a construction equipment, an off-highway vehicle, a boat, a ship or a submarine.

6. A method for determining information associated with a vehicle, the method comprising:
    determining a saved amount of fuel and a reduced amount of emissions, using a controller;
    measuring an amount of energy supplied by an energy storage device and communicating information about the amount of energy to the controller; and
    determining the saved amount of fuel and the reduced amount of emissions based on the amount of energy supplied by the energy storage device and information correlating an amount of energy used by the vehicle to an amount of fuel consumed by the vehicle and an amount of emissions emitted by the vehicle, for reducing tax liability of the vehicle.

7. The method according to claim 6, further comprising:
    switching an operating mode of the vehicle from a first operating mode in a first zone having an associated first characteristic to a second operating mode in a second zone having an associated second characteristic that differs from the first characteristic in response to the vehicle translating from the first zone to the second zone.

* * * * *